United States Patent [19]

Haeuptli

[11] 4,206,531

[45] Jun. 10, 1980

[54] SUCTION PUMP

[75] Inventor: Walter Haeuptli, Aarburg, Switzerland

[73] Assignee: Homax AG, Oberwil, Switzerland

[21] Appl. No.: 832,030

[22] Filed: Sep. 9, 1977

[51] Int. Cl.² ............................................... B08B 5/04
[52] U.S. Cl. ........................................ 15/341; 15/359; 15/415 R
[58] Field of Search ................. 15/341, 344, 354, 359, 15/415 R

[56] References Cited

U.S. PATENT DOCUMENTS

| 1,037,027 | 8/1912 | Lindberg | 15/359 |
| 1,342,345 | 6/1920 | Moore et al. | 15/359 X |
| 3,862,468 | 1/1975 | Fortune | 15/341 |

Primary Examiner—Christopher K. Moore
Attorney, Agent, or Firm—Blanchard, Flynn, Thiel, Boutell & Tanis

[57] ABSTRACT

A suction pump for removing excess soldering tin at a soldered joint. The suction pump has a tensionable piston which jumps or snaps back upon a release thereof. A shock occurs in the suction pump and is transmitted onto a collecting nozzle. A shock absorbing device is mounted in axial direction in the collecting nozzle and absorbs the shock to act positively on the operation.

9 Claims, 4 Drawing Figures

U.S. Patent
Jun. 10, 1980
4,206,531
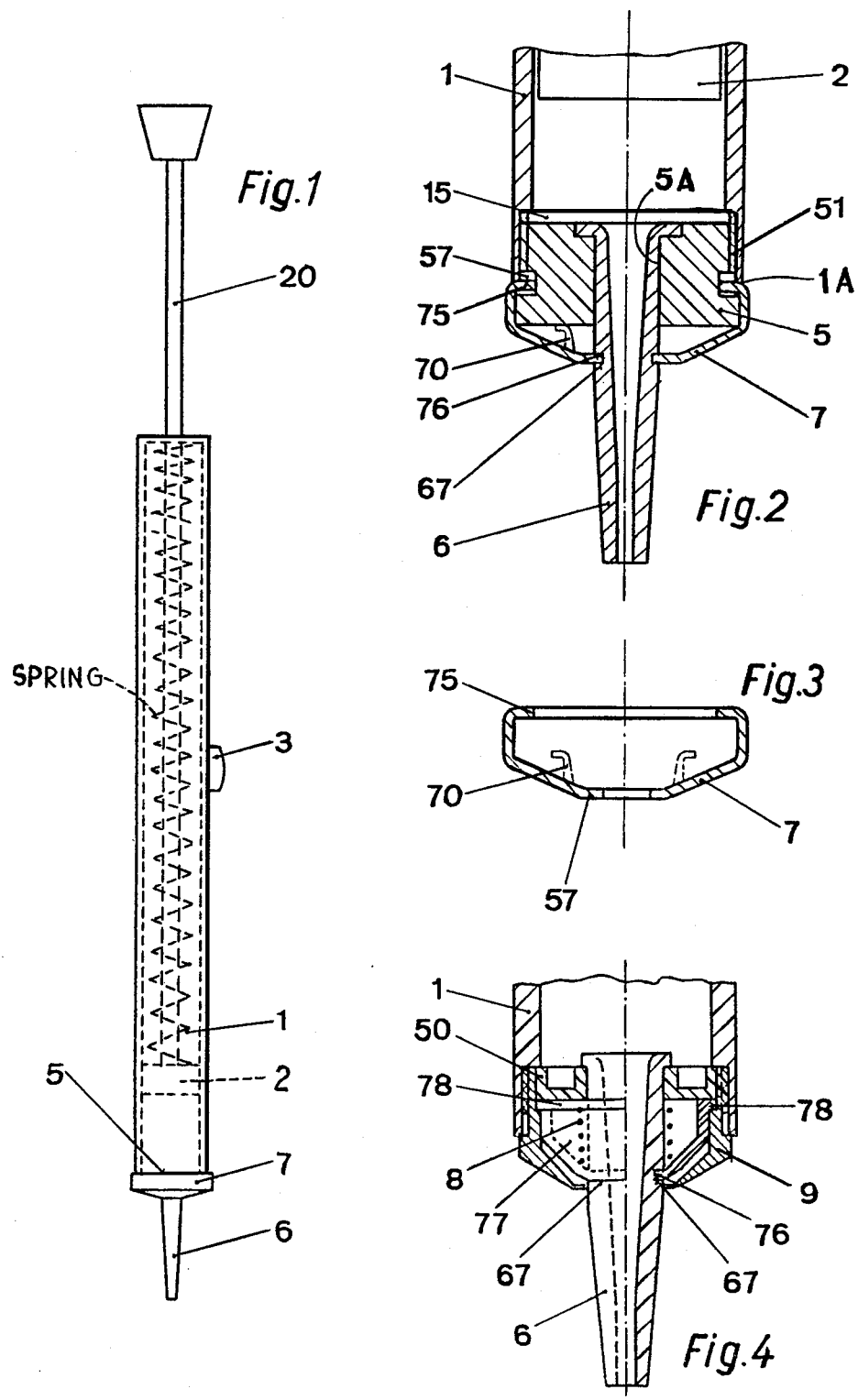

4,206,531

SUCTION PUMP

FIELD OF THE INVENTION

The invention relates to a suction pump for removing excess soldering tin from a soldered joint, comprising a suction cylinder having a collecting nozzle and a piston, which can be pressed and locked in the suction cylinder against the force of a spring, after which the lock is released for effecting a sudden movement of the piston and the development of a sudden suction at the nozzle outlet.

BACKGROUND OF THE INVENTION

For creating a readiness to operate of such suction pumps, the suction piston is moved into a tensioned or cocked position. If soldering tin is now to be sucked off from a soldered joint, the collecting nozzle is moved near the soldering tin which is to be sucked off and the lock of the suction piston is released. The suction piston jumps or snaps back promptly and it is difficult to maintain the suction pump stationary due to the recoil action.

The purpose of the invention is to absorb the recoil action on the collecting nozzle, which recoil action is created by the suction movement of the suction piston.

This is carried out in a suction pump of the above-mentioned type by the collecting nozzle extending in axial direction of the suction cylinder and being held movably in this direction through a shock absorbing device.

This assures a movability of the collecting nozzle and a simultaneous seal during installation of the collecting nozzle into the suction cylinder.

BRIEF DESCRIPTION OF THE DRAWINGS

Two exemplary embodiments of the subject matter of the invention are illustrated in the drawings, in which:

FIG. 1 is a view of a suction pump for removing of excess soldering tin;

FIG. 2 is a longitudinal view in an enlarged scale of a first modified embodiment of a collecting nozzle;

FIG. 3 is a cross-sectional view of the rubber sleeve; and

FIG. 4 is a longitudinal cross-sectional view of a second modified embodiment of a collecting nozzle.

DETAILED DESCRIPTION

The suction pump consists of a suction cylinder 1 having a piston 2 slidably supported therein and can be operated manually by means of a manually engageable piston rod 20. Reference numeral 3 identifies a press button which serves to unlock a tensioned or cocked piston 2. A solder collecting nozzle 6 extends along the axis of the cylinder 1 and is arranged at the bottom of the cylinder, that is the end remote from the piston rod 20. More specifically a screw plug 5 is threadedly secured to the cylinder 1 and has a central opening 5A therethrough. The collecting nozzle 6 is received in the opening 5A and is slidable therein. A funnel-shaped or caplike, rubber-elastic sleeve 7 is mounted around the collecting nozzle 6 and the screw plug 5. This sleeve 7 has an upper, radially inwardly turned in edge 75 received in an annular groove 57 in the screw plug 5 while the lower edge 76 thereof is received in an annular groove 67 in the collecting nozzle 6. The screw thread 51 on the screw plug 5 extends to the groove 57. A lower recess 15 is provided in the end of the cylinder 1 adjacent the nozzle 6 and is deeper than the height of the thread 51. With this structure the lower edge 1A of the cylinder 1 is supported on the turned in edge 75 of the sleeve 7 and assures an air-tight seal thereat.

As a preparatory action in the removal of soldering tin by the suction process, the piston rod 20 is pressed into the cylinder against the force of a spring which is mounted within the cylinder. The piston 2 is locked in a conventional manner (not illustrated in detail) in the pushed-in position and can be released by means of the push button 3. A release of the piston rod by actuating the push button 3 will effect a sudden withdrawal of the piston rod from the cylinder 1. This sudden movement of the piston rod is of an advantage because a reduction in pressure is transmitted to the collecting nozzle. Since the nozzle 6 is held by the rubber-elastic sleeve 7 on the screw plug 5 and thus on the cylinder 1, the sudden and firm axially directed shock toward the nozzle end is not directly transmitted onto the nozzle, but is absorbed by the sleeve or is reduced by it due to a flexing of the material thereof. The nozzle 6 can easily spring back into the plug 5. This spring action can still be further increased by inner, rubber-elastic tabs 70, which are supported on the sleeve 7 and plug 5. In other words, the sleeve 7 absorbs shocks imparted to the collecting nozzle 6 while held against a workpiece by the reactive force generated by the release of the piston.

In place of the tabs 70, it is also possible to provide a helical spring between the sleeve 7 and the plug 5.

FIG. 4 illustrates a modified embodiment in which a rubber sleeve 77, which is susceptible to external damage, is covered by a solid hood 9 made of metal or hard plastic and protects the sleeve from damage by the soldering bit.

An end plug 50 is embedded in the lower end of the suction cylinder 1 and has a center opening for supporting the collecting nozzle 6. The collecting nozzle can move axially in this opening. The rubberlike sleeve 77 is supported on the end plug 50, the upper edge of which sleeve is constructed as a bead or annular rim 78 and the lower edge 76 of which engages an annular groove 67 of the suction nozzle 6. The hood 9 is placed for protection over the entire arrangement, in particular over the sleeve 77 and consists, as aforesaid, of metal or a hard plastic and is screwed into the lower end of the suction cylinder 1 to effect a pressing of the edge bead 78 against the end plug. The sleeve 77 is thus fixedly secured.

A helical pressure spring 8 effects a pressing of the collecting nozzle away from the suction cylinder 1 and absorbs shocks which occur during the release of the suction pump. The spring 8 is provided inside of the sleeve 77 and is supported at one end against one side of the plug 50 and at the other end against the wall of the sleeve 77.

Although particular preferred embodiments of the invention have been disclosed in detail for illustrative purposes, it will be recognized that variations or modifications of the disclosed apparatus, including the rearrangement of parts. lie within the scope of the present invention.

The embodiments of the invention in which an exclusive property or privilege is claimed are defined as follows:

1. In a suction pump for removing of excess soldering tin from a soldered joint, comprising a suction cylinder having a collecting nozzle with an outlet opening, and a reciprocable piston which can be pressed and locked against the force of a spring in the suction cylinder engaging and extending between the piston and a wall of said suction cylinder, after which the lock is released to cause the piston to promptly move to effect a suction pressure at the nozzle outlet opening, the improvement comprising wherein the collecting nozzle is supported for movement relative to the suction cylinder and the longitudinal axis thereof extends parallel to the longitudinal axis of the suction cylinder and shock absorbing means for absorbing shocks imparted to the collecting nozzle while held against a workpiece by the reactive force generated by the release of the piston, said shock absorbing means being connected between said cylinder and said nozzle.

2. The improved suction pump according to claim 1, wherein the shock absorbing means consists of a caplike rubber member.

3. The improved suction pump according to claim 1, wherein the collecting nozzle is movably supported in a screw plug adjacent an end of the suction cylinder.

4. The improved suction pump according to claim 3, wherein both the screw plug and also the collecting nozzle have a peripheral groove into which the shock absorbing means is snugly received.

5. The improved suction pump according to claim 4, wherein the shock absorbing means includes a caplike rubber member having a central opening therein receiving the collecting nozzle therethrough, the edge of the central opening being received in the peripheral groove on the collecting nozzle, another radial edge on the caplike member being offset from the edge of the central opening along the axis of the suction cylinder and being turned in and received in the peripheral groove in the screw plug.

6. The improved suction pump according to claim 5, wherein the screw plug has a screw thread thereon, and wherein the peripheral groove on the screw plug merges into the screw thread, such that the wall of the suction cylinder rests sealingly on the caplike rubber member.

7. The improved suction pump according to claim 5, wherein the caplike rubber member has a funnel shape and rubber-like tabs are arranged inside of the wall surface thereof and adjacent the central opening, which tabs engage the screw plug.

8. The improved suction pump according to claim 5, wherein an end plug having a hole therein is arranged in one end of the suction cylinder, in which hole in the end plug the collecting nozzle is movably supported, which end plug is held stationarily by a hood which is screwed into the suction cylinder end, whereby between plug and hood, the other edge of the caplike rubber member is clamped and the edge of the central opening encloses the collecting nozzle in the peripheral groove.

9. The improved suction pump according to claim 8, wherein the shock absorbing means includes a pressure spring arranged between the end plug and the caplike rubber member.

* * * * *